United States Patent [19]

D'Luzansky

[11] Patent Number: 5,052,158

[45] Date of Patent: Oct. 1, 1991

[54] MODULAR LOCKING FLOOR COVERING

[75] Inventor: John D'Luzansky, Mesa, Ariz.

[73] Assignee: Foam Design Consumer Products, Inc., Lexington, Ky.

[21] Appl. No.: 552,580

[22] Filed: Jul. 13, 1990

[51] Int. Cl.$^5$ .............................................. E04C 1/10
[52] U.S. Cl. ...................................... 52/177; 52/392; 52/591; 52/594; 404/41
[58] Field of Search ................. 52/386, 387, 392, 591, 52/594, 309.4, 177; 404/32, 19, 41, 42, 35, 34

[56] References Cited

U.S. PATENT DOCUMENTS 4,018,025 4/1977 Collette ............................ 52/392 X
4,287,693 9/1981 Collette ............................ 52/591 X

FOREIGN PATENT DOCUMENTS 97369   7/1898 Fed. Rep. of Germany ........ 52/589
2010144 9/1971 Fed. Rep. of Germany ..... 52/309.4
2547637 4/1977 Fed. Rep. of Germany ........ 52/594
2613082 10/1977 Fed. Rep. of Germany ..... 52/309.4

OTHER PUBLICATIONS

Mitchell Royal Product Literature, 52-594, Copyright 1971.

Primary Examiner—Richard E. Chilcot, Jr.
Attorney, Agent, or Firm—Beehler & Pavitt

[57] ABSTRACT

An improved modular and cushion forming interlocking floor covering which is light weight, easy to assemble, disassemble and to store is composed of a plurality of panels. Each panel includes interlocking means composed of spaced locking fingers and locking apertures and secondary locking means. The secondary locking means are in the form of tabs in the face of the finger and the base of the aperture, each tab having a face inclined in a direction opposite the inclined face of an adjacent tab. The geometry of the modules, in the case of a square module is such that a module may be removed, turned over, oriented and reinserted where removed. Various forms of cushion structure using a foam are described.

14 Claims, 4 Drawing Sheets

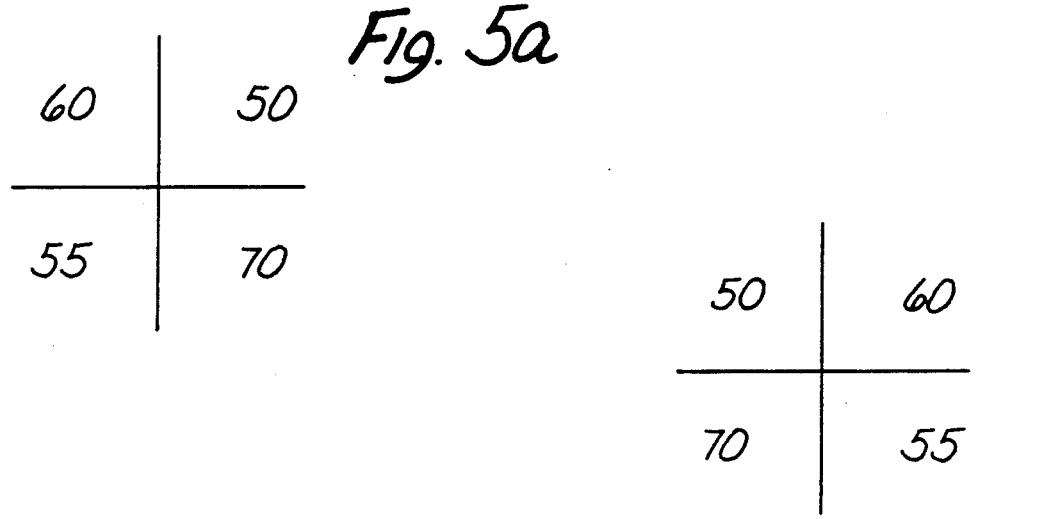
Fig. 5a
Fig. 5b
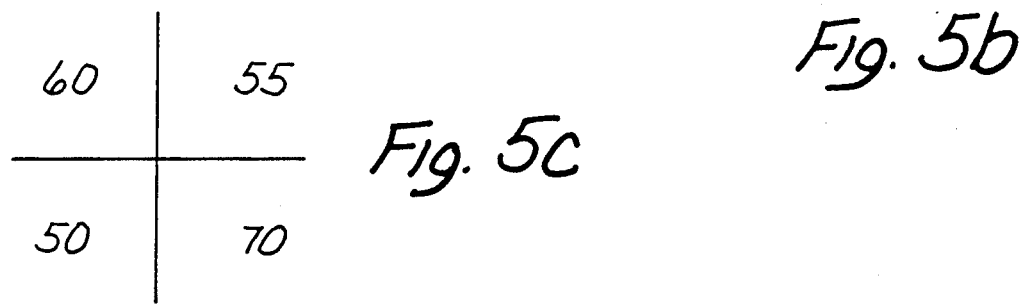
Fig. 5c
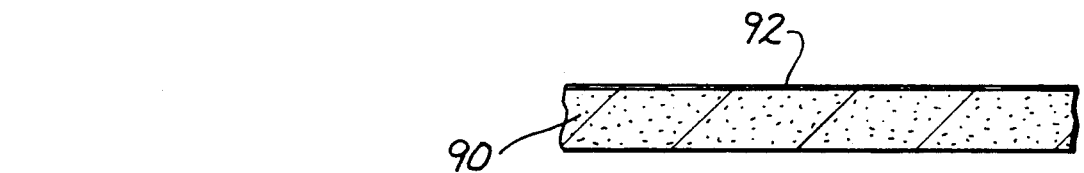
Fig. 7
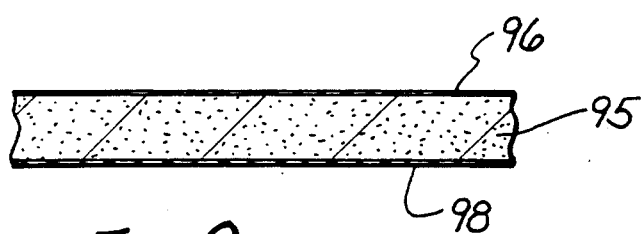
Fig. 8
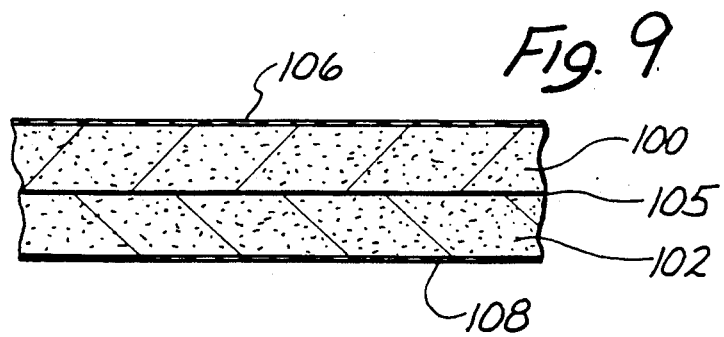
Fig. 9 ns along the seams to respond differently to shock loads than the portions of the panels remote from the joint seams. The result is that upon application of a compression load close to the seam, there is a generally vertical compression of one region of the panel but not the other adjacent and separate panel. This, in turn, may cause a relative vertical displacement of the local regions adjacent the seam such that the surfaces, which should remain planar and smooth, are vertically misaligned. In effect there is a high and adjacent low spot along the seam, i.e., relative vertical displacement, possibly due to one locking finger becoming wedged under the mating finger due to compression of one and not the other, even though the mating locking fingers are operative to maintain lateral locking of the mating panels.

MODULAR LOCKING FLOOR COVERING

FIELD OF INVENTION

The present invention relates to a modular floor covering and, more particularly, to an improved modular and cushion forming interlocking floor covering which is light weight, easy to assemble and disassemble and to store and which remains flat when assembled and during use.

DESCRIPTION OF THE PRIOR ART

Various structures are known in the prior art for providing a temporary floor covering, typically for use as a cushioned exercise floor which may be temporarily used by the assembly together of separate modular panel components. One such use is an aerobic exercise floor which may be assembled over a hard flat gymnasium floor or other flat support surface. Other such uses are as a mat for wrestling or any other sports or exercise programs or other activities which require or where it is desirable to provide a cushioned mat structure capable of withstanding compression loads to provide comfortable cushioning.

Thus, for example, it is known to provide modular flat panels, of foam or other cushioning medium, which are provided with interlocking tabs along the periphery of the panel so that the panels may be retrieved from a storage area and then assembled over a flat floor into a cushioning mat of the desired size. The size may vary from a relatively small area of 13 feet by 22 feet or may cover an entire gymnasium floor or a large portion of the floor. After use, the panels are disassembled and stored. The obvious advantage is that an exercise or sports or room area may be quickly and effectively provided with a cushioned mat for use in an activity which requires cushioning, followed by storage of the panels.

The use of peripheral interlocking and mating tabs is sometimes effective in maintaining the relative lateral orientation of the panels. Maintaining the lateral positioning of the panels may be enhanced by a non-slip bottom surface in contact with the support floor. It is important that there not be gaps between adjacent panels with the result that there are portions of the working floor which are not cushioned.

In order to provide effective cushioning, however, the panels should be compressible to cushion shock loads and return to absorb later shock loads. Such shock loads are generally perpendicular to the plane of the cushioning surface, although there are types of activities in which the shock loads may be at an angle, typically aerobic exercises which involve jumping and "side-straddle" types of activities. Moreover, the shock loads are random in location and in intensity. It is apparent that the cushioning floor structure should remain planar and flat with essentially each region of the assembled floor responding in a basically similar manner to the imposed shock loads, i.e., the assembled modular panels should respond as if they were one large integral structure.

One of the problems with modular interlocking panels used to provide a temporary cushion exercise surface in which cyclic and random compression loads are encountered is the tendency of relative vertical displacement along the region of the seam which forms the interlocking joint between adjacent panels. In effect, there is a tendency of the regions of adjacent panels In the case of vigorous exercises or physical activities which necessitate a smooth, planar and flat surface for comfort, and perhaps safety, the prior art modular panels tend to be subject to vertical displacement along the joints during use, even if lateral displacement is prevented.

Thus, one object of this invention is to provide an improved modular cushioned forming interlocking floor covering which tends to remain in position both laterally and vertically.

Another object of this invention is the provision of an improved modular floor panel which is light weight, composed of a compressible and resilient material, and which may be quickly and effectively assembled into a cushioning floor mat through the provision of an improved panel locking mechanism.

Still another object of this invention is provision of an improved locking system of a unique configuration for modular panels to be used in providing a temporary cushioned floor covering wherein improved locking inhibits relative lateral and vertical displacement of the adjacent interlocked panels.

BRIEF DESCRIPTION OF THE INVENTION

The above and other objects of this invention are achieved through the provision of an improved locking mechanism for modular panels intended to be interlocked and used as a temporary cushioning structure which overlies a relatively flat surface.

In general, the panels of this invention are composed of a compressible and resilient material and include along at least one edge a series of mating and interlocking fingers which are received in butting and locking engagement. The individual panels may be square or rectangular, although the invention is not limited to those shapes. In a preferred form, however, each panel is of the same size and of the same unique geometry for reasons which will be described.

In a preferred form, each panel includes a body section with a periphery which includes a plurality of spaced locking fingers separated by spaced locking apertures. The locking fingers of one panel are received in the locking apertures of an adjacent panel, while the locking apertures of the one panel receive the locking fingers of the adjacent panel. The locking fingers preferably include a wide free end and face and converging side walls terminating in the locking aperture having a base facing in the same direction as the face of the finger and having a dimension corresponding to the wide free end of the mating finger. In effect, the side walls of the locking fingers are contoured to fit the locking aperture. In the case of the finger, the side walls converge from the face of the finger towards the body of the panel while in the case of the locking aperture, the wall appears converging such that the narrow end is spaced from the body portion.

The mating fingers and apertures form an interlock which provides resistance to lateral movement of the adjacent panels, a feature which is enhanced by the commonly contoured walls which are converging in the case of the finger and diverging in the case of the aperture. The result is that all panels are effectively securely locked against relative lateral movement.

Added enhanced locking is provided by a unique secondary locking structure which tends to prevent relative vertical displacement of adjacent locked panels, especially along the seam of adjacent modular panels. In a preferred form the secondary locking structure is structured to maintain the interface between the face of finger and the corresponding base of the associated locking aperture in vertical alignment, thus tending to keep each locking finger in a planar orientation with respect to the corresponding aperture.

In a preferred form, the secondary locking structure is in the form of tabs on the face of the locking finger and mating tabs on the base of the aperture. There are preferably at least two tabs on each of the finger face and the aperture base. The tabs each include an inclined tab face. Thus, the tab faces on the finger face are oppositely inclined to mate with correspondingly oppositely inclined tab faces on the base of the aperture The result is that the inclined faces of the mating tabs tend to prevent relative vertical movement especially in the seam area. Due to the enhanced lateral locking, the inclined face tabs are generally effective for the purposes described.

Another feature of this invention, in the case of panels of the same edge dimension, i.e., square panels, is the ability to turn any single panel over and reinsert where removed without taking the entire assembled mat structure apart. The ability to remove a panel form an assembled mat, turn it over and reinsert it where removed is related to the unique corner configuration of each panel. In brief, diagonal corners are provided with a finger having a curved surface and a flat, non-curved surface. One corner, between the diagonal corners referred to is essentially square, while the forth corner, diagonal to the square corner includes a finger which is pointed. By removing a panel, turning it over and rotating it 90 degrees in the proper direction, the panel can be reinserted upside down in the location from which it was removed.

Numerous other objects and advantages of the present invention will become apparent from the following specification which, together with the accompanying drawings, describes and illustrates preferred forms of the present invention.

DESCRIPTION OF THE DRAWINGS

FIG. 5a, 5b, 5c are diagrammatic illustrations of the sequence for removing and reinserting a module in accordance with the present invention;

FIG. 7 is a sectional view of one form of interior structure of a modular panel in accordance with this invention;

FIG. 8 is a view similar to FIG. 7 of another interior structure of a modular panel according to this invention; and FIG. 9 is a view similar to FIG. 7 of still another interior structure of a modular panel according to this invention and especially adapted for use as an exercise or aerobic floor.

DETAILED DESCRIPTION OF THE INVENTION

Figure 1:
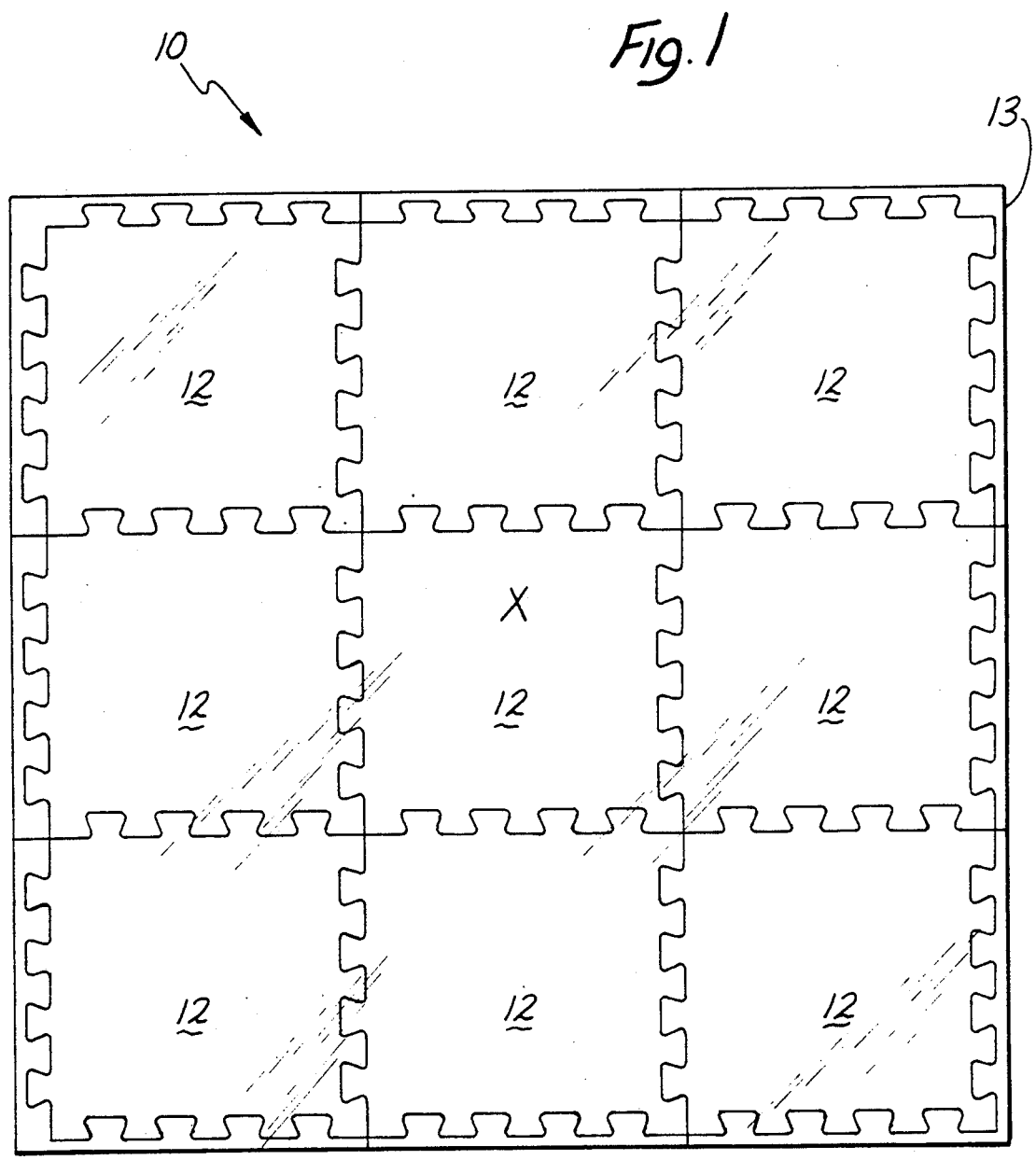
FIG. 1 is a plan view of an assembled modular interlocking cushioned product in accordance with the present invention.

Referring to the drawings which illustrate preferred forms of the present invention, FIG. 1 illustrates an assembled cushioned floor structure 10 in accordance with this invention As shown, the structure is composed of a plurality of modular panels 12, assembled in a generally square configuration For example, in the form illustrated the cushioned mat structure 10 may measure 14 feet on a side. It is understood, however, that other geometric configurations and sizes may be used and this is one of the advantages of a modular structure in accordance with the invention.

In the form illustrated, the cushioning mat includes a decorative border 13 which is optional. The border may function to prevent wear along the periphery, to provide flush abutment with the edge of the assembled modules. The panels 12 are shown of a generally square configuration, although other geometric shapes may be used. A panel of a square configuration is preferred in order to permit the panels to be turned over without disassembling the entire mat structure, as will be discussed. As shown, the mat 10 forms a cushioning mat capable of being compressed by application of a local load and returning to the uncompressed condition, i.e., the mat and the panels are resiliently compressible. The mat structure 10 is normally placed over a flat floor with the result that a flat, planar and smooth exercise surface is provided which may easily assembled, used, disassembled and stored.

Figure 2:
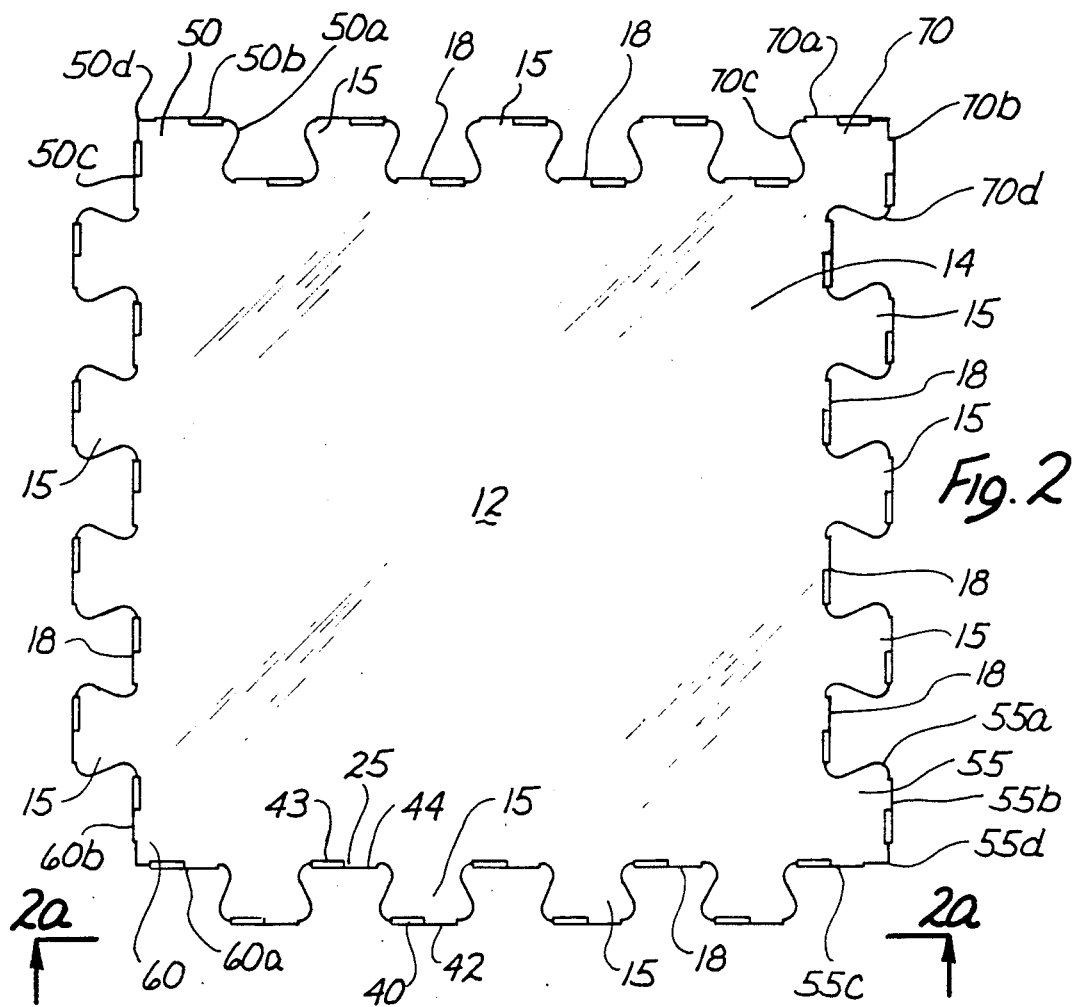
FIG. 2 is a plan view of a single modular panel for use in a cushioning product in accordance with this invention.
Figure 2A:
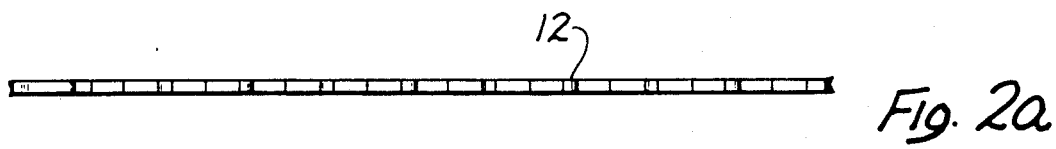
FIG. 2a sectional view as seen from the line 2a—2a of FIG. 2.

Referring to FIGS. 2 and 2a, a single module 12 is shown, the individual modules 12 being flat with a smooth planar surface on top and on bottom. In a preferred form, each module includes a center body portion 14 having peripheral side edges, as illustrated. Each side edge of the module 12 includes a plurality of spaced locking fingers 15, although it is understood that locking fingers only need be on an edge which is to be assembled to an adjacent module. Located between the spaced locking fingers is a locking aperture 18. In effect, the periphery of the module is a series of locking fingers with locking apertures therebetween. Thus, as seen from FIG. 1, the mode of assembly generally involves the finger 15 of one module being received in the locking aperture 18 of an adjacent module.

Figure 3:
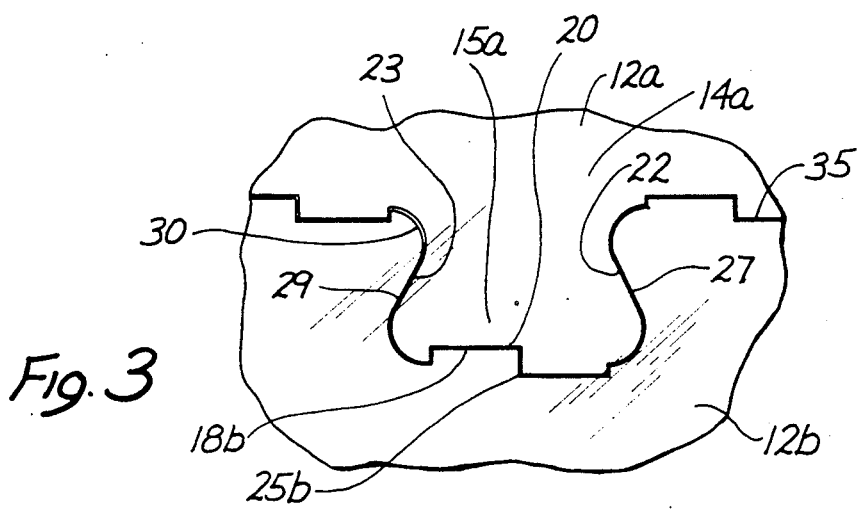
FIG. 3 is an enlarged plan view of a locking finger of one module and corresponding locking aperture of another module in accordance with this invention.

FIG. 3 illustrates, on an enlarged scale as compared to the prior illustrations, the configuration of the locking finger and mating locking aperture of adjacent panels 12a and 12b. Except as otherwise noted, each of the locking fingers of each of the modules is of the same configuration and each of the locking apertures of each of the modules is of the same configuration. The locking finger 15a of panel 12a includes a relatively wide free end and face 20 and side walls 22 and 23. The side walls of the finger 15a diverge in that the dimension between the walls at the face 20 is greater than the dimension between the walls where the finger joins the body portion 14a of module 12a.

The cooperating locking aperture 18b of panel 12b includes a base 25 and spaced side walls 27 and 29 which converge in that the dimension between the walls 27 and 29 at the base 25 is greater than the dimension at the open end 30 of the locking aperture. In effect, the configuration of the locking finger and the cooperating locking aperture are essentially the same in what amounts to a dove tail fit. As illustrated, a seam 35 is formed between adjacent assembled panels. The use of a dove tail lock provides enhanced resistance to relative lateral movement of module 12b relative to 12a.

Figure 4:
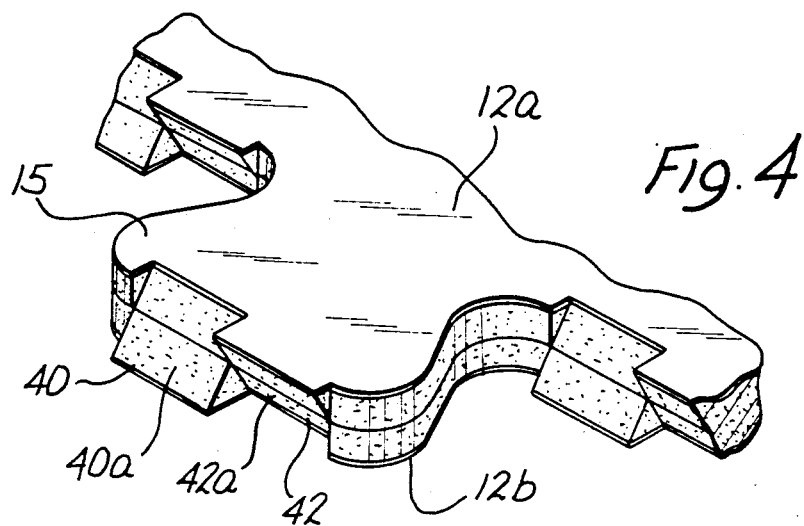
FIG. 4 is a view in perspective of the secondary locking mechanism in accordance with this invention.

Referring now to FIGS. 2 and 4, a secondary locking means is provided to inhibit relative vertical movement of the modules in the region of the seam 35. The secondary lock means, in a preferred form, includes tabs 40 and 42 in the face of the finger 15 and tabs 43, 44 in the base 25 of the locking aperture. The tabs 40 and 42 each include an inclined face 40a and 42a, respectively, the faces 40a and 42a being oppositely inclined as seen in FIG. 4. The left most tab 40 has a face 40a which is inclined rearwardly relative to the top surface 12a of the module while the other tab 42 includes a face 42a which is inclined rearwardly relative to the bottom surface 12b of the module, it being understood that reference to "top" and "bottom" is relative.

The tabs 43 and 44 are configured the same as tabs 40 and 42 in that tab 43 includes a face which is inclined oppositely from the inclined face of tab 44. Thus, tab 43 has a face inclined in the same direction as face 40a, while the face of tab 44 is inclined in the same direction as face 42a. When assembled, the inclined faces of the tabs on the face of the locking finger mate and interlock with the inclined faces of the tabs in the base of the locking aperture. The mating tabs thus form a secondary locking system which extends along the seam between adjacent modules and which locks each locking finger-locking aperture joint to inhibit relative vertical movement.

Relative vertical movement is inhibited by what amounts to a multiplicity of wedge locked joints each of which is formed by mating inclined tab faces. In this way, even if a compressive force is exerted near the seam, for example, on a locking finger 15, there is a tendency to compress the adjacent region of the associated locking aperture due to the secondary locks. For example, in a typical module structure, the locking finger may extend about two inches from the body and the face dimension may be three inches. It is accordingly entirely possible that in vigorous exercising, a localized compression load may be imposed on a finger or in the region of a locking aperture along the seam and adjacent to a mating finger. Thus, the tendency for the regions of the mat structure adjacent the seam to remain flat and essentially smooth, i.e., free of portions raised above or depressed below the desired flat plane of the mat surface is reduced, if not eliminated.

One of the features of the present invention is the relative configuration of the locking fingers and locking apertures such that any particular module may be removed from the assembled mat and turned over and reinserted in place. This feature of the invention is achieved by a module whose side edge dimensions are the same and wherein the dimensional size of each module is the same. It is possible to form a cushioned mat using modules of different geometrical shape and still achieve the lateral and vertical locking as described, however, such a mat would not include individual modules which could be removed, turned over and reinserted. Accordingly, the unique pattern of locking fingers and locking apertures provides considerable flexibility and replacement of a particular module, if necessary, without disassembly of the entire modular floor structure.

Referring to FIGS. 1 and 2, the module 12 is illustrated as being square with each of the side edges being of the same dimension. The diagonal corners 50 and 55 include a locking finger which includes a curved section 50a and 55a and intersecting non-curved side walls 50b, 50c, and 55b and 55c, respectively. The side wall pairs 50b–50c and 55b–55c form square corners 50d and 55d as illustrated, the square corners being diagonally oriented. The corner 60 of the module, formed by non-curved side walls 60a and 60b, between the square corners 50d and 55d is also square, as shown. Each of the walls 50b, 50c, 55b, 55c, 60a and 60b includes tabs, as already described, for secondary locking. Curved walls 50a and 55a effectively also form one of the curved walls for the adjacent locking aperture.

The forth corner 70 of the module 12 includes a square corner section formed by non-curved walls 70a and 70b and functions as a locking finger. The walls 70a and 70b each include locking tabs for secondary locking as already described. Associated with each of the side walls 70a and 70b is a curved wall 70c and 70d, the latter also effectively forming one of the curved side walls for the adjacent locking aperture, as illustrated.

Referring now to FIG. 1, if the center module marked "X" is removed from the mat, the module has the relative orientation illustrated in FIG. 5a. When turned over, the module has the relative orientation illustrated in FIG. 5b. It is apparent from FIG. 5b that in the illustrated orientation, the turned over module will not fit in the location from which it was removed. However, if the module is then rotated counterclockwise 90 degrees to the orientation illustrated in FIG. 5c, the module will fit in the location from which it was removed. This is apparent from a comparison of FIGS. 5a and 5c in which corners 70 and 60 are in the correct orientation while corners 50 and 55 have been flipped over. Since corners 50 and 55 are of the same configuration, the turned over and properly oriented module may be reinserted in the space from which it was removed. This feature of the invention permits any module to be turned over and placed back without disassembling the entire mat structure. This feature may be applicable to any modular floor structure of a temporary nature and is not limited to a cushioned modular floor structure.

Figure 6:
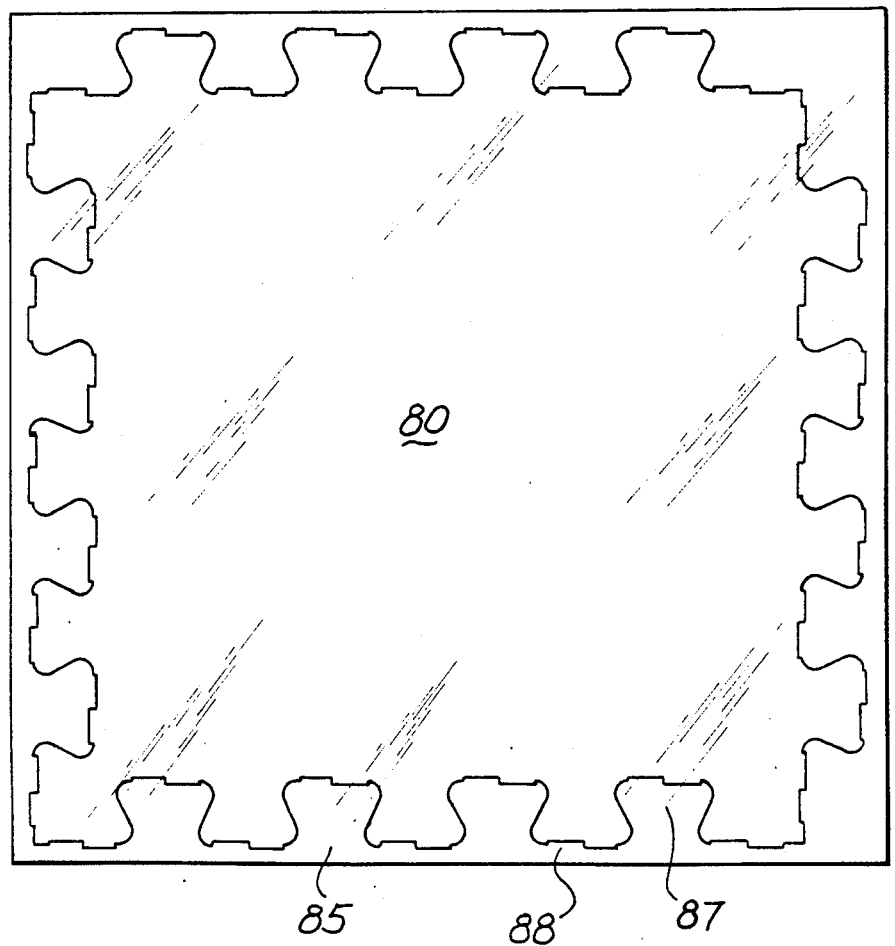
FIG. 6 is a plan view of an interlocking border element for use in accordance with this invention.

Referring now to FIG. 6, a form of module 80 is shown with a border or trim edge 85. The module 80 is essentially the same in structure as module 12, already described. The trim edge is configured with locking fingers and locking apertures 87 and 88 which mate with those of module 80, as illustrated and already described with reference to fingers 15 and apertures 18. The trim edge may be used to protect the module 80 during shipment or storage or may be used to provide a border as illustrated in FIG. 1.

The interior structure of the module may vary widely depending on the intended use of the modular floor. For example, the internal structure may be a simple foam material for use as a sub-flooring over an ice skating rink which also serves as a hardwood floor for basketball. In such a case, the foam may be rigid and have appropriate thermal insulating properties. In the case of a foam material, various additives may be included in the foam such as fire retardants for an F6 fire safety rating. Another relatively simple interior structure may be as illustrated in FIG. 7 in which foam material 90 is covered by a plastic or scrim cloth like upper surface 92. Depending on ultimate use, the foam may be rigid or compressible. The structure of FIG. 7 is essentially a one sided module in which the foam side overlies the support floor with the surface 92 being the upper top surface.

In the case of a modular structure intended for use as an exercise or aerobic floor, the interior structure may be as illustrated in FIG. 8, and which may include a foam center 95 with an upper and lower covering 96 and 98, respectively. The foam center may be a closed cell compressible, resilient and flexible polyethylene foam of 4 pound density, for example. The coverings may be of the same or different materials to provide a two sided module. For example, the coverings each may be a woven scrim of linear low density polyethylene coated to lock the fabric scrim in place and to seal the surface. Such a surface is easy to keep clean and germ free. The thickness may be 2½ mils, for example. Fire retardants and anti-slip additives may be incorporated into the coverings which may be of the same or different colors. One surface may be the scrim described an the other may be a rug or carpet texture, by way of illustration.

FIG. 9 illustrates an interior structure ideally suited for aerobic and exercise uses to provide a cushion forming floor covering In this form, there is one foam layer 100 which may be the upper foam layer composed of a flexible, resilient, compressible cross-linked closed cell polyethylene foam of 2 pound density, for example. The lower foam layer 102 may be composed of a flexible, resilient, compressible cross-linked closed cell polyethylene foam of 4 pound density, for example. The use of a higher density foam as the lower layer tends to prevent "bottoming out" because its compression resistance is higher. It is understood, however, that foam layers 100 and 102 may be of the same density foam.

Between the two foam layers 100 and 102 is a center scrim material 105 which may be an open weave of polyethylene material. The scrim material is bonded to the adjacent foam layers and tends to prevent the foam components from stretching laterally in response to a localized compression load. The top foam layer 100 may be covered by a carpet or rug material, or may be covered with a polyethylene scrim which includes a polypropylene film to render the scrim a continuous film as indicated at 106. In either case, the covering 106 is securely bonded to the foam material. The same scrim material used for the top covering may be used for the lower covering 108 which is bonded to the lower foam layer 102, as shown. As earlier noted, the additives mentioned may be used.

The manufacture of the modules includes formation of the foam material and bonding the covering to the foam, if a covering is used. In the case of the structure of FIG. 9, the foams are formed, bonded to the center scrim and the outer coverings are applied. Thereafter, the modules are cut to size and the tabs are provided through the use of a five axis cutter using a high velocity jet. This method of cutting provides smooth straight edges and accurate angles. The edges are not crushed or weakened by the compression of a die. The result is an accurately fabricated module capable of being assembled to provide a seam which is tight and flush.

While reference has been made to polyethylene foams and scrim materials, it is apparent that other foam materials and fabric or fabric like materials may be used, depending on the intended use and service life of the modules. It is also apparent that various features of the present invention may be practiced with material other than foam, for example, other flexible, resilient, compressible materials.

It is contemplated that numerous changes, modifications and/or additions may be made to the specific embodiments of the present invention shown in the drawings and described above without departing from the spirit and scope of the present invention. Accordingly, it is intended that the scope of this invention be limited only by the scope of the appended claims.

What is claimed is:

1. A relatively light weight modular interlocking cushioned product subject to localized compression loads for use as a floor covering and the like, comprising:
   at least two planar panel members of a compressible and resilient material,
   each panel including at least one edge portion having interlocking means for removable interfitting and interlocking butting engagement of the respective edge portions thereof whereby said panels may be assembled together to provide a laterally interlocked flat and planar cushioning mat,
   said interlocking means including spaced locking fingers with locking apertures therebetween,
   said interlocking means of each panel further including secondary interlocking means to maintain the respective edge portions in a flat and planar orientation to prevent relative vertical displacement of the respective interlocked edge portions in response to compressive loads thereon, and
   said secondary interlocking means including locking tabs each having an inclined face, the face of one tab being inclined oppositely from the inclined face of an adjacent tab.

2. A relatively light weight modular interlocking cushioned product as set forth in claim 1 wherein each said panel member includes outer coverings and a foam material between said outer coverings.

3. A relatively light weight modular interlocking cushioned product as set forth in claim 2 wherein said foam material is a closed cell flexible, compressible and resilient foam.

4. A relatively light weight modular interlocking cushioned product as set forth in claim 2 wherein said foam material includes a first foam layer and a second foam layer which may include a scrim material between said layers to prevent lateral stretching of said foam layers in response to a compression load.

5. A relatively light weight modular interlocking cushioned product as set forth in claim 4 wherein the density of the foam of the first foam layer is different from the density of the foam of the second foam layer.

6. A relatively light weight modular interlocking cushioned product as set forth in claim 1 wherein said panel members are square shaped.

7. A relatively light weight modular interlocking cushioned product as set forth in claim 1 wherein said panel members are rectangular in shape.

8. A relatively light weight modular interlocking cushioned product as set forth in claim 1 wherein said locking fingers include side walls which converge and said locking apertures include side walls which diverge.

9. A relatively light weight modular interlocking cushioned product as set forth in claim 8 wherein said locking fingers include a face and said locking apertures include a base, and
said tabs being located in the face of said locking fingers and in the base of said locking apertures.

10. A relatively light weight modular interlocking product as set forth in claim 1, wherein:
each panel includes corner configurations comprising a square corner, an interlocking corner and remaining corners which include both interlocking fingers and interlocking apertures,
said remaining corners with both said interlocking fingers and interlocking apertures being arranged in a diagonal orientation such that a panel may be removed, turned over and oriented to be reinserted in the location from which it was removed.

11. A relatively light weight modular interlocking product as set forth in claim 10 further including secondary interlocking means to maintain the respective edge portions in a flat and planar orientation to prevent vertical displacement of the respective interlocked edge portions.

12. A relatively light weight modular interlocking product as set forth in claim 10 wherein said locking fingers include side walls which converge and said locking apertures include side walls which diverge.

13. A relatively light weight modular interlocking product as set forth in claim 11 wherein said secondary interlocking means includes locking tabs each having an inclined face, the face of one tab being inclined oppositely from the inclined face of an adjacent tab.

14. A relatively light weight modular interlocking cushioned product subject to localized compression loads for use as a floor covering and the like, comprising:
at least two planar panel members of a compressible and resilient material,
each panel including side edge portions having interlocking means for removable interfitting and interlocking butting engagement of the respective edge portions thereof whereby said panels may be assembled together to provide a laterally interlocked flat and planar cushioning mat,
said interlocking means of each panel further including secondary interlocking means to maintain the respective edge portions in a flat and planar orientation to prevent relative vertical displacement of the respective interlocked edge portions in response to compressive loads thereon,
said interlocking means including spaced locking fingers with locking apertures therebetween and wherein said secondary interlocking means includes locking tabs each having an inclined face, the face of one tab being inclined oppositely from the inclined face of an adjacent tab,
said locking fingers including a face and said locking apertures including a base,
said tabs being located in the face of said locking fingers and in the base of said locking apertures,
each said panel member including a closed cell flexible, resilient and compressible foam material, and
said foam material including a first foam layer and a second foam layer with a scrim material between said layers to prevent lateral stretching of said foam layers in response to compression load.

* * * * *